United States Patent
Karwath et al.

(10) Patent No.: US 7,067,998 B2
(45) Date of Patent: *Jun. 27, 2006

(54) DRIVE CIRCUIT FOR BRUSHLESS DC MOTORS

(75) Inventors: Arno Karwath, Rottweil (DE);
Mojtaba Moi, Königsfeld (DE);
Eberhard Wünsch, St. Georgen (DE)

(73) Assignee: Papst Licensing GmbH & Co. KG, Spaichingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/685,375

(22) Filed: Oct. 14, 2003

(65) Prior Publication Data
US 2004/0239274 A1 Dec. 2, 2004

Related U.S. Application Data

(63) Continuation of application No. 10/101,121, filed on Mar. 19, 2002, now abandoned, which is a continuation of application No. 09/021,207, filed on Feb. 10, 1998, now Pat. No. 6,384,554, which is a continuation of application No. 08/465,138, filed on Jun. 5, 1995, now Pat. No. 5,717,297, which is a continuation of application No. 07/956,948, filed on Oct. 5, 1992, now Pat. No. 5,583,404.

(30) Foreign Application Priority Data
Oct. 3, 1991 (DE) .............................. P 41 32 881

(51) Int. Cl.
*H02P 3/08* (2006.01)
(52) U.S. Cl. ...................... 318/254; 318/138; 318/439; 388/800
(58) Field of Classification Search ................ 318/254, 318/138, 439; 388/800–806, 809–812, 815
See application file for complete search history.

(56) References Cited

U.S. PATENT DOCUMENTS

| | | | | |
|---|---|---|---|---|
| 4,119,895 A | * | 10/1978 | Muller | 318/254 |
| 4,276,504 A | * | 6/1981 | Nagase et al. | 318/721 |
| 4,376,262 A | * | 3/1983 | Okuda et al. | 318/696 |
| 4,426,585 A | * | 1/1984 | Bigalke | 290/38 B |
| 4,507,590 A | * | 3/1985 | Miyazaki | 318/254 |
| 4,651,068 A | * | 3/1987 | Meshkat-Razavi | 318/254 |
| 4,712,050 A | * | 12/1987 | Nagasawa et al. | 318/254 |

(Continued)

FOREIGN PATENT DOCUMENTS

CA 1301240 5/1992

(Continued)

OTHER PUBLICATIONS

Steltzer, J., "Mit Stammbaum," ElectronikPraxis, Nr. 19-3, Oct. 1991, pp. 56-58, 60-61.

(Continued)

*Primary Examiner*—Rina Duda
(74) *Attorney, Agent, or Firm*—Fitch, Even, Tabin & Flannery

(57) ABSTRACT

A drive circuit for brushless DC motors including a rotor and a stator with at least one stator coil includes a commutation device which supplies commutation pulses of drive current to the stator coil(s). The commutation device senses the rotor position and calculates current rotor speed therefrom. The rotor speed is then used to shift the commutation circuits according to predetermined functions. The shifting of commutation currents is occasioned by shifting either or both of the ignition part of a commutation pulse and the extinction part of such pulse.

27 Claims, 10 Drawing Sheets

U.S. PATENT DOCUMENTS

Figure 1:
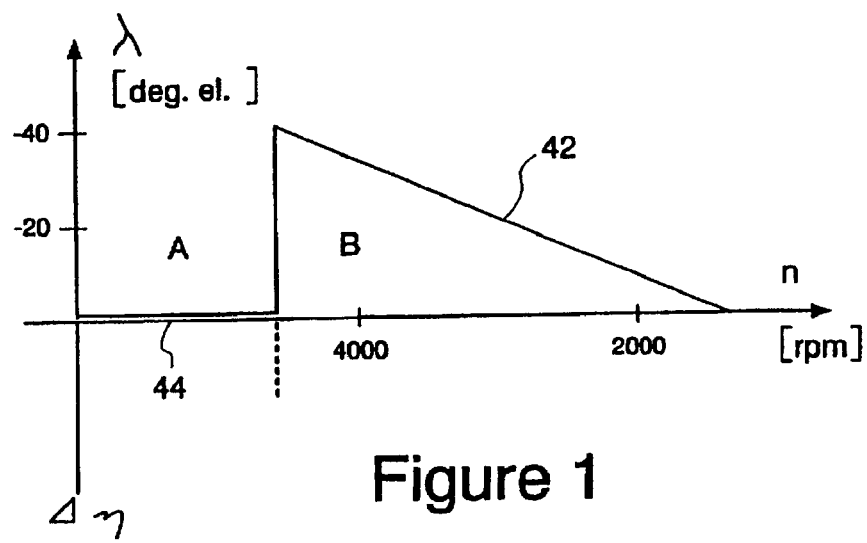

| | | | | |
|---|---|---|---|---|
| 4,803,408 | A | * | 2/1989 | Uhde et al. ............... 318/254 |
| 4,804,892 | A | * | 2/1989 | Muller .................... 318/254 |
| 4,808,902 | A | * | 2/1989 | Miyazaki et al. .......... 318/798 |
| 5,038,090 | A | * | 8/1991 | Kawabata et al. ......... 318/721 |
| 5,043,643 | A | * | 8/1991 | Hedlund et al. ........... 318/254 |
| 5,138,244 | A | * | 8/1992 | Bahn ...................... 318/701 |
| 5,227,704 | A | * | 7/1993 | Erdman .................... 318/254 |
| 5,569,900 | A | * | 10/1996 | Blohbaum ............ 235/462.28 |
| 5,583,404 | A | * | 12/1996 | Karwath et al. ........... 318/254 |
| 5,640,073 | A | * | 6/1997 | Ikeda et al. ............... 318/439 |
| 5,717,297 | A | * | 2/1998 | Karwath et al. ........... 318/254 |
| 6,384,554 | B1 | * | 5/2002 | Karwath et al. ........... 318/254 |

FOREIGN PATENT DOCUMENTS

| | | |
|---|---|---|
| DE | 28 56 538 A1 | 8/1979 |
| DE | 31 07 641 A1 | 1/1982 |
| DE | 31 13 092 A1 | 10/1982 |
| DE | 31 51 254 A1 | 7/1983 |
| DE | 31 51 257 A1 | 7/1983 |
| DE | 32 09 391 A1 | 9/1983 |
| DE | 32 09 394 A1 | 9/1983 |
| DE | 33 25 610 A1 | 1/1984 |
| DE | 35 37 403 A1 | 4/1987 |
| DE | 38 17 916 A1 | 12/1988 |
| DE | 38 19 062 A1 | 12/1989 |
| DE | 3819 064 A1 | 12/1989 |
| DE | 40 21 098 A1 | 1/1991 |
| DE | 40 09 184 A1 | 9/1991 |
| EP | 0 397 143 A1 | 5/1990 |
| EP | 0 505 159 A2 | 9/1992 |

OTHER PUBLICATIONS

Draeger, Jurgen et al. Forschungsberichte, No. 2754, 1978, pp. 60-61.

Schaltverhalten der Elektronischen Steuerung, NaiS/SDS, ASF Lüfter, Nov. 13, 1991.

* cited by examiner $t_a$ = current sensing time

DRIVE CIRCUIT FOR BRUSHLESS DC MOTORS

This is a continuation of application Ser. No. 10/101,121 filed Mar. 19, 2002, now abandoned, which is a continuation of application Ser. No. 09/021,207, now U.S. Pat. No. 6,384,554, issued May 7, 2002, which is continuation of application Ser. No. 08/465,138, filed Jun. 5, 1995, now U.S. Pat. No. 5,717,297, issued Feb. 10, 1998, which is a continuation of application Ser. No. 07/956,948, filed Oct. 5, 1992, now U.S. Pat. No. 5,583,404, issued Dec. 10, 1996.

The invention pertains to a drive circuit for brushless dc motors.

Drive circuits of this kind are known from DE-OS 35 37 403 A1. These circuits exhibit a number of properties that are advantageous for the operation of a commutatorless dc motor.

Sample functions include:
low loss speed control of the motor,
temperature governed speed control of the motor,
signal output in case of excess temperature,
reduction of acoustic and EMI radiation.

One particular advantage of these circuits consists in the fact that they can be fully integrated onto a relatively small silicon module (chip). There, these circuits on their allocated silicon module, represent a very high functional density. It is therefore difficult and complicated to implement additional module functions of this type since signal functions and performance control functions will have to be present side-by-side on the same silicon chip.

For greater power or higher speed motors, however, more extensive speed control functions and control functions are required.

In addition, it is an advantage to achieve a yet higher efficiency for the motor and associated drive circuit.

Therefore, it is the task of the invention to describe an electronic circuit that will ensure an improved overall efficiency for the drive circuit and motor by means of a wider speed range and to include an expanded level of functions.

The invention is suitable both for single phase motors with permanent magnetic auxiliary torque according to DE-OS 23 46 380, and also for multiphase motors or commutatorless motors without permanent magnets (reluctance motors).

The invention is based on the fact that for purposes of additional energy savings through increasing the overall efficiency of the motor and drive circuit, the following activities are combined:

First, according to this invention it is an advantage specifically to shift in time the rising and/or falling edges of motor current pulses by means of a suitable circuit, and, of course, especially as a function of the speed of the motor. This will achieve both reliable start-up behavior and also good efficiency for the motor.

For all motors in the range of high and maximum speed, it is an advantage to shift forward the moment of connection of a motor current pulse in order to provide the necessary current maximum in a timely manner due to the finite rate of rise of a motor current pulse. Depending on the motor and speed range, shifts of the commutation timing by several ten degrees (electric) is an advantage.

In the case of motors with permanent magnetic auxiliary torque, it is particularly useful to shift the turn-off edge of a motor current pulse forward in time within the range of minimum speed (increase of the extinction angle), where the stated extinction angle can amount to as much as about 90° (electric).

After start-up of the motor (ramp phase) within an average speed range, normally no essential shift in the moments of commutation is needed, whether for the ignition angle at the beginning of current flow or for the extinction angle at the end of a motor current pulse.

In this range, therefore, we can succeed, even without specific measures, in bringing the time rise of a stator current pulse into approximate coincidence with the shape of the induced counter-EMF of an (unconnected) stator coil, in a generally known manner.

Secondly, the first activity according to this invention, is combined with a circuited (clocked) current flow to the motor (i.e., usually the stator), and, of course, with a clock frequency preferably outside of the range of human hearing.

This measure has the advantage that by means of differing individual pulse widths in the clocked method of current flow, the effective motor current can be preset and adjusted in a simple manner without any large losses in performance due to this adjustment process, as is already generally known. In addition, in a similarly known manners the advantage results that the effective, maximum rate of rise of the motor current can be increased through simultaneous increase in the supply voltage.

It is understood that the supply voltage cannot be increased indefinitely, so that also the effective maximum rate of rise of the motor current remains limited to a finite value.

For high motor speeds it is therefore an advantage to effect a preshifting of the ignition timing, even in the case of circuited or clocked motor current.

In this case, one decisive parameter, in addition to the motor speed, is the electric time constant of the motor coils: the ratio of inductivity to resistance, L/R.

In addition, according to the invention it is an advantage to modify the high frequency timing of the motor current during one commutation phase in the direction of smaller pulse duty factors, and, of course, toward the end of one commutation phase. It has proven advantageous to reduce the percentage of the pulse duty factor in two steps each of about 5% after passage of 50% and 75%, respectively, of one commutation phase. This will also avoid additional expense as is necessary in a continuous reduction of the pulse duty factor during one current flow phase, and, furthermore, the latter method has the same or better power reduction effect.

In a third aspect of the invention actions are illustrated that will ensure the provision of differing ignition or extinction angles and thus cause a preignition or advanced extinction of a motor current pulse.

Proceeding from a standard ignition with an ignition angle of zero, it is initially not possible in the range of high and maximum speed of the motor to implement in advance any commutations without a knowledge of future moments of commutation, as this is actually necessary for preignition (according to definition).

According to this invention, in order to solve this problem, the signal output for a commutation is undertaken by means of a galvanomagnetic sensor. However, in this case the sensor is intentionally placed at a location, e.g., between stator and rotor, that will cause a forwardly shifted signal output of, e.g., 5° (electric), as compared to normal signal output. By means of a delay feature in the drive circuit, a delay in these commutation signals will also be possible. Thus it is possible to generate advance ignition angles up to a specified angular value. A delay feature that can delay the commutation signals in a variable manner is a particular advantage, so that the actual start of a commutation process can take on any value between the stated value and later phase angles or moments.

At greater speeds that can necessitate a more prominent forward shift of the ignition angle, the problem again arises of the absence of knowledge of the phase position of the rotor at the desired moment of ignition, at which the commutation process of the stator current is to begin. In addition, the problem exists that the optimum moment of commutation is being shifted constantly, i.e., depending on the speed of the rotor, it consists of another phase position or speed setting of the rotor.

However, according to the invention, in this case, a solution is possible according to the following logic:

The additionally necessary phase preshifting of the moment of ignition occurs practically only at high speeds. At these speeds, the rotational motion due to the mechanical inertia of the rotor, i.e., of the stored mechanical energy, is determined practically for several future rotations of the rotor.

Accordingly, it is possible, with a knowledge of the current rotational speed of the rotor and of the last moment of signal output of the rotational position sensor, to calculate a moment that corresponds to a desired or necessary, future moment of ignition at the current rotational speed (angular velocity) of the rotor.

In this case, according to the invention, a generally known device will be used that determines the rotational velocity of the rotor from the progress of the last determined sensor signals.

In this case, the following mathematic relation will be used:

$$Z=K(n)+(K(n)-K(n-1))*(1+\phi(\omega)/360°(el.))$$

where Z is the time of the prognosticated or extrapolated, future, next moment of ignition, while K(n) or K(n−1) is the moment of the last or next to last output signal of the sensor.

$\phi(\omega)$ represents the necessary speed-dependent angle of the preignition which always has a negative sign with regard to a standard commutation with ignition offset 0.

In a preferred circuit design it is provided that the forward shifting of the ignition timing increases linearly with increasing speed of the motor. This takes place in a range between a motor-typical reference speed and the maximum permissible motor speed.

The rise in the associated characteristic curve that shows the forward shift as a function of the speed is also typical of the motor. Reference parameters of this type that are typical of the motor, will be placed in a simple manner as table values in the memory of the circuit configuration.

It is a precise method to perform the forward shifting of the ignition timing in a nonlinear manner, for example, according to a characteristic curve in the form of a hyperbola. Parameters of this type can also be stored in the memory are a of a circuit device.

A compromise solution between linear and nonlinear forms of the characteristic curves according to this invention consists in approaching nonlinear regions by means of stepwise, linear regions.

For particular regions it is possible according to the invention, also to implement unsteady transitions of the characteristic curve.

The actions to shift the falling edge of a (stator) current pulse will also be carried out accordingly with a delay device to delay the rotational setting-sensor signal for the definition of the moment of commutation.

One preferred solution consists in delaying the signal of the rotary position sensor by a comparatively long time span by means of a delay device of this type in order then to suspend the current flow to the motor temporarily at the delayed moment. This can occur, e.g., by specifying a pulse duty factor with value zero. This method will be simplified in an advantageous manner by the use of microprocessor functions—likewise for the design of the delay itself.

It is also the advantage to make the stated delay of the signal of the rotational position sensor dependent, in a nonlinear manner, on the speed of the motor.

In particular, in the case of motors with permanent magnetic auxiliary torque, a delay feature with the following operation will be used according to this invention:

In the ramp range up to a speed of about 600 rpm, an extinction angle of 0° (electric) will be retained; that is, no preshifting of the shut-off timepoint will take place. Above this speed value, an extinction angle of about 40° (electric) will be specified which will be reduced up to a rated speed of about 3000 rpm in a continuous, preferably linear tanner to the value zero.

In every case it is an advantage to place values belonging to the curve profile into a memory or in an electronically readable table.

Therefore, it is a benefit to provide a circuit design in the device for the above stated functions of the control circuit that contains a microprocessor or controller.

According to this invention this, opens up the potential to provide a number of additional functions for the control circuit, where the increased hardware and software effort in comparison to the attainable, additional benefit is small or is to be judged favorably.

If an expansion of this kind of drive circuit is to be undertaken at a later time, so that yet more functions will be added, then, as a rule, this is not particularly difficult.

Now the additional functions pertain primarily to checking and control or regulation functions that are supplied both with regard to external physical parameters, and also with regard to internal motor parameters.

For the stated external physical parameters, we are dealing, for example, with temperatures. This will be measured, e.g., by means of a temperature-dependent resistor and fed to a microprocessor that converts the different levels of resistance values into temperature values. The resistance values will be checked for plausibility. Deviations from a permissible value range will be recognized by the microprocessor and cause an alarm signal.

According to a computed temperature or another physical parameter, the microprocessor or the drive circuit determines what speed the motor is to use by means of a predefined table or by means of a specified function. This desired speed will be compared with the actually occurring speed. Deviations between the desired and actual speed will be minimized or eliminated through an appropriate change in motor current.

In this case, the drive circuit has a device, as discussed above, with which the motor current can be fed at high frequency in differing wide, individual pulses. By means of this current setting feature, therefore, a speed control is possible for the motor. Furthermore, it is also possible to limit the motor current with this device.

When the rotor of the motor is blocked, a speed control device usually tries to bring the motor back into rotation by means of maximum current.

However, this can lead to excessive motor temperature and possibly to damage to the motor.

Therefore, according to the invention, a device is provided that will determine the motor current punctually at specified times, and limit the motor current to a specified value.

For the case of a blocked rotor, a device is also provided that will cause a short-term, super-elevated motor current, whereupon rated current will be fed to the motor for a time and a check run will be initiated to determine whether this kind of start attempt has set the rotor in motion. If this is the case, then a normal motor power feed will take place as described above.

Otherwise, a current interrupt will occur, so that the motor can cool off. After a preadjustable time, a renewed start attempt will be performed in the same manner.

In addition, it is possible to perform improved alarm functions for motor operation. These functions consist, for examples in maintaining a constant coordination of motors when several motors are operating in parallel.

For this purpose, of course, communications or alarm signal features can be provided that are performed according to this invention by means of the mentioned microprocessor. Another improvement for an alarm function consists in the fact that the output alarm signals can contain supplemental information so that an easier and more reliable validation of a registered alarm is possible.

This will be set up according to the invention so that a valid alarm signal may have only one prespecified minimum or maximum size. Another solution consists in an alarm signal having at least one ac voltage signal component of predefined frequency and amplitude characteristics.

Additional designs and explanations of the invention are found in the subclaims and from the figures.

FIG. 1

The functional relation between motor speed and a profile of the moment of shift of commutation (extinction angle) per this invention in degrees (electric)

FIG. 2a

An (overall) efficiency improvement for a motor and a drive circuit as a function of the motor speed in an optimum shift of the moment cf ignition

FIG. 2b

A diagram of the operation of a device that predicts a future moment of commutation

FIG. 3

Functional relationships between the angle or the time of a current feed phase for the motor and associated pulse duty factor (ED) for the power application pulse at high and constant frequency

FIG. 4

Likewise the functional relationship between time, pulse duty factor of the power feed pulses and resultant, average motor current for one power feed phase for a motor

FIG. 5

The functional relation between temperature, and the associated desired motor speed, n.

FIG. 6

The functional relation between motor speed and the associated motor current, particularly for speeds near the rated speed n(nominal).

FIG. 7

The functional relation between motor speed and an associated weighting of a control coefficient for the motor speed; here, the coefficient for the proportional component k(p).

FIG. 8

A block diagram for a motor with associated drive circuit that contains a microprocessor

FIG. 9

A timing chart for a motor current specification with the motor blocked

FIG. 10

A circuit detail for temperature measurement

FIG. 11A

A circuit plan for the output stages of the drive circuit according to this invention

FIGS. 11B, 11C

Additional related circuit diagrams for a control and monitoring unit in the form of a microprocessor, and also for an externally positioned rotational position sensor (commutation signal indicator) and externally positioned motor coil.

FIG. 12

Diagrams to explain the operation the prognosis of a moment of commutation (prognosis of a moment of ignition)

FIG. 1 illustrates how the shift in the extinction angle per this invention will be undertaken for a motor with permanent magnetic auxiliary torque as a function of the speed of the motor.

The speed of the motor is plotted on the abscissa; depending on the particular application, it can also take on greater values than shown.

The value of the preliminary shift of the moment of commutation (extinction angle) is plotted on the ordinate in degrees (electric).

The speed range below 700 rpm is identified with symbol "A" and comprises the line segment 11.

The speed range includes the start-up and an initial ramp range of the motor and has no preshifting of the extinction angle.

Line segment 12 pertains to a second ramp range of the motor and exhibits continually falling extinction angles that amount to a maximum of about 60° (electric).

A preshifting of the extinction angle or also of the ignition angle for a motor current pulse takes place according to this invention by means of a delay of a commutation signal that in itself is advanced by a phase angle of about 5° (electric) with regard to a zero crossing of the induced voltage of a stator coil.

A delay in the ignition signal of this type such that an effective ignition angle of, e.g., zero degrees (electric) will set in; it will thus be undertaken as follows:

From the preceding determinations of the (advancing) ignition signal, the current speed of the motor will be recognized if one determines the tire differences between sequential ignition signals, e.g. with a timing component. If a pulse sequence from a crystal oscillator is counted out between two such signals, then, in a very accurate manner it is possible to determine the elapsed time difference. The reciprocal value of this time difference is known to be a frequency that differs from the angular velocity by a factor of 1×3.1415 or n×3.1415, where n is a natural number. With the general relation $\phi = \omega \times \tau$, according to which an angle of rotation is computed as the product of angular velocity multiplied by a time difference, the drive circuit delays the ignition signal by means of a built-in delay circuit by precisely the time necessary to define a desired, advanced (possible delayed) moment of ignition or extinction, at the current speed of the motor, at which the commutation process will be initiated or ended for the stator current fed.

As we can see from FIG. 1, in a speed range of over approximately 25% of the rated speed, the extinction angle will be reduced with increasing speed, and, of course, with the above-mentioned delay techniques.

For the delay of a previously occurring moment of ignition, it is possible to use the phase offset of the commutation signal as an advantage. For the medium to high speed range accordingly, an adaptation of the optimum, speed dependent preignition point can be effected by means of a delay in the signal of the galvanomagnetic rotational position sensor.

This is possible up to a speed at which no more delay takes place between the signal output through the positional setting sensor and the initiation of the commutation process. This means that the preignition has the same electrical phase offset as will correspond to the geometric offset of the signal generator.

An additional preliminary shift of the ignition angle in a high tc very high speed range for the motor is thus possible according to the invention only when a preceding signal from the rotational position sensor is delayed in phase by the difference between the electrical angle for a commutation phase, e.g., 180° or 360° (electric) and the desired, advanced ignition angle, and effects the beginning of a corresponding commutation process.

Therefore, by calculation and moderate sequencing of the delay of the equivalent commutation or ignition signal, this corresponds to a relatively large angle that is smaller than 180°, 360° (electric), etc. For three-phase and higher-phase motors, therefore, a delay of somewhat less than 120° (electric), 90° (electric) etc., will be needed, and it must be taken into account whether the particular motor is to be designed as single pulse or double pulse.

For this method as well, the above referenced method for delay by the drive circuit will be used to advantage; this drive circuit will be prepared in a particularly economical manner by digital means.

As is evident from the foregoing, this type of moment of ignition definition is not strictly causal, since the commutation process takes place at a time that has to be extrapolated or prognosticated.

Figure 2A:
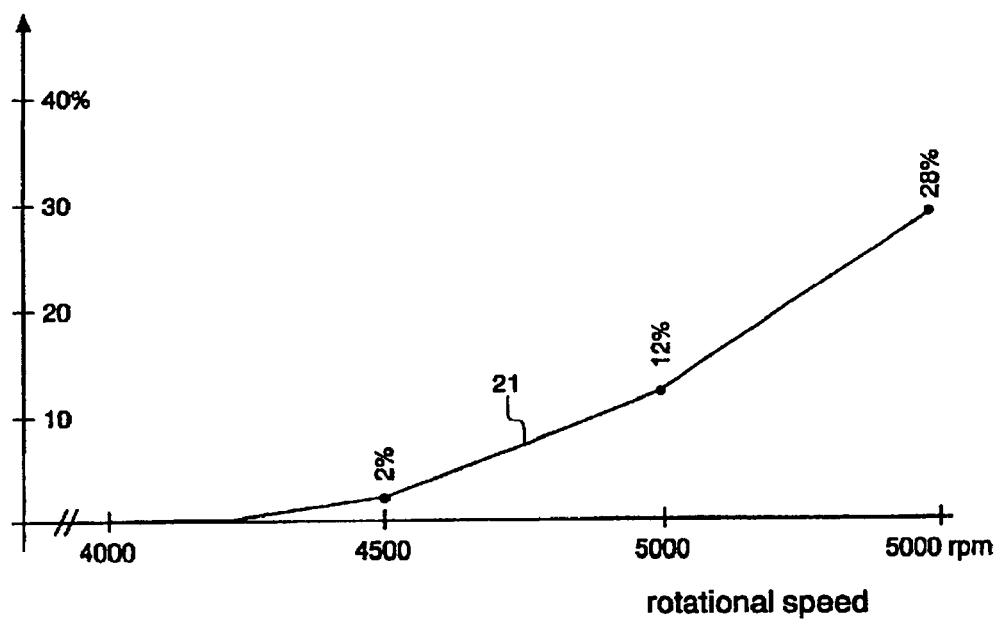

FIG. 2a shows a function with reference number 21 that reproduced the speed-dependent improvement of the overall efficiency for a motor and its drive circuit.

This function is different from one type of motor to the next.

Figure 2B:
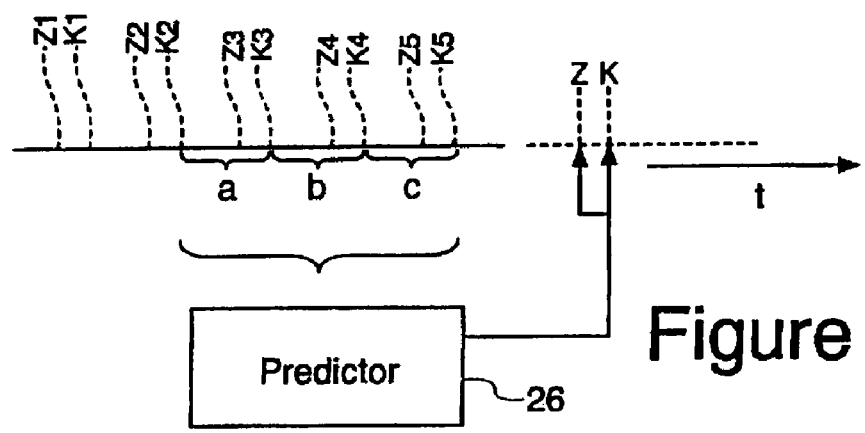

FIG. 2b explains how the extrapolation of a desired moment of ignition at high speeds can be carried out with a predictor segment 26 of the drive circuit.

On the time axis denoted by the letter "t," the previous moments of ignition Z1, Z2, Z3, Z4 and Z5 are plotted. They differ by advancing, individual time or phase angle components from the moments of the commutation signal output K1 . . . K5 which have been delivered by the rotational position sensor of the motor.

From the last recorded time difference K5-K4, the speed of the motor is known, and the future commutation process at time Z will be undertaken in the range of about 300° . . . 360° (electric) later, depending on this known speed; see the formula stated above for time Z.

Figure 3:
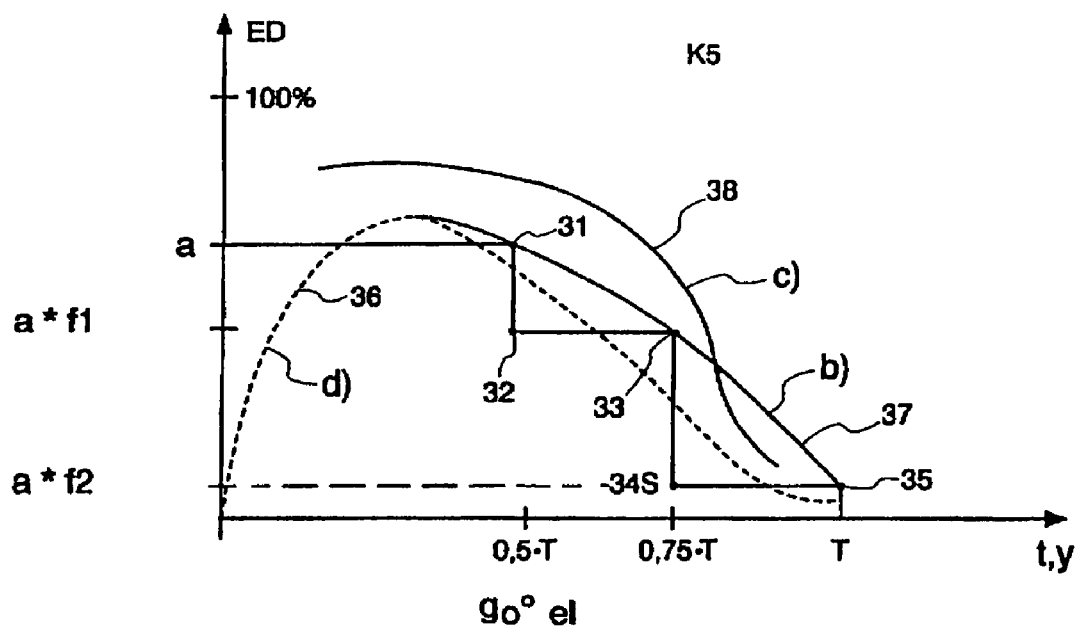

FIG. 3 shows the relation between a time or angle value of a commutation phase of a motor and associated specified values of the pulse duty factor ED. A low cost profile of the pulse duty factor of specific, high frequency motor current pulses with a frequency of more than 5000 Hz will be represented by the line that emanates from point "a" on the ordinate and then connects points 31, 32, 33, 34 and 35. Up to a time that corresponds to about 50% of a commutation phase of the motor, a pulse duty factor with a percentage "a" will be used. Then, up to a value of about 75% of a commutation phase, this percentage will be reduced by a factor f1. For the remainder of the commutation phase, an even smaller factor f2 will be specified.

With a somewhat more complicated drive circuit it is also possible to implement a prespecified or preprogrammed profile of the pulse duty factor in continuous form.

Functions b) (reference number 37) and c) (reference number 38) show this. The general pulse shape of an associated stator current average value will be symbolized by function 36. It is important that the current not rise toward the end of the commutation phase, as is otherwise the case, provided no corresponding current limitation activities are undertaken. Activities of this type with circuit features from analog technology are already known and have the advantage as in the case described here, of reducing the operating noise of a motor.

Figure 4:
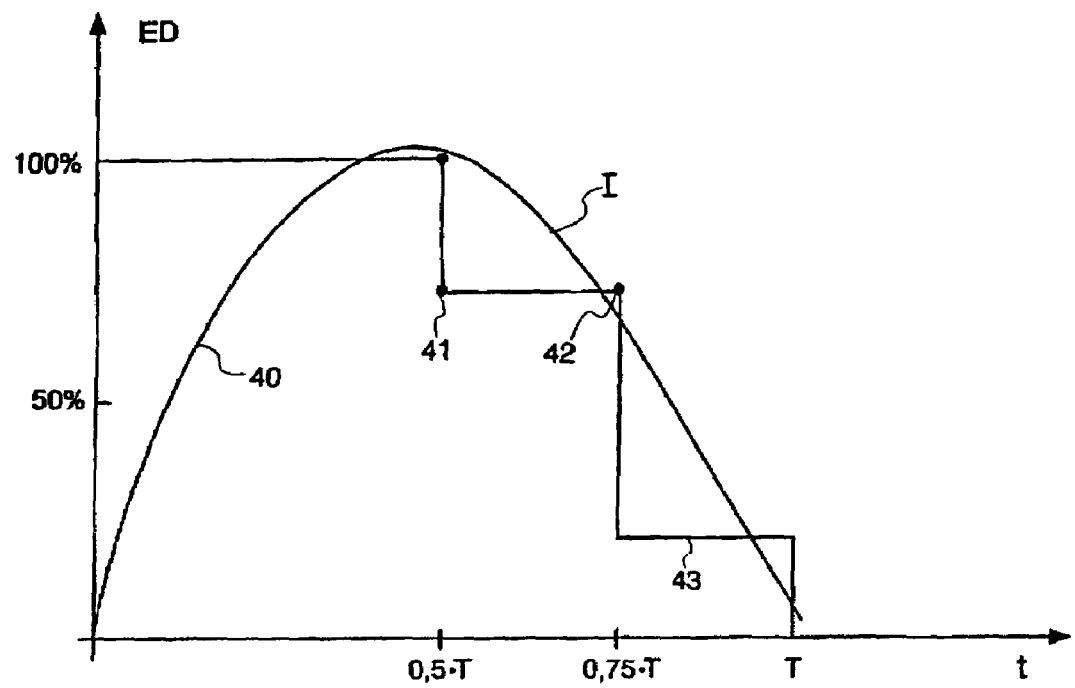

A comparable power curve is shown in FIG. 4. A commutation phase extends from the origin of the coordinate intersection up to the time T. Within this time, power is applied with single pulses of the specified pulse duty factor ED, where the single pulses exhibit a repetition frequency of 1/42.5 µsec, and in the specific case of FIG. 4, they begin with a pulse duty factor of 100%.

Figure 5:
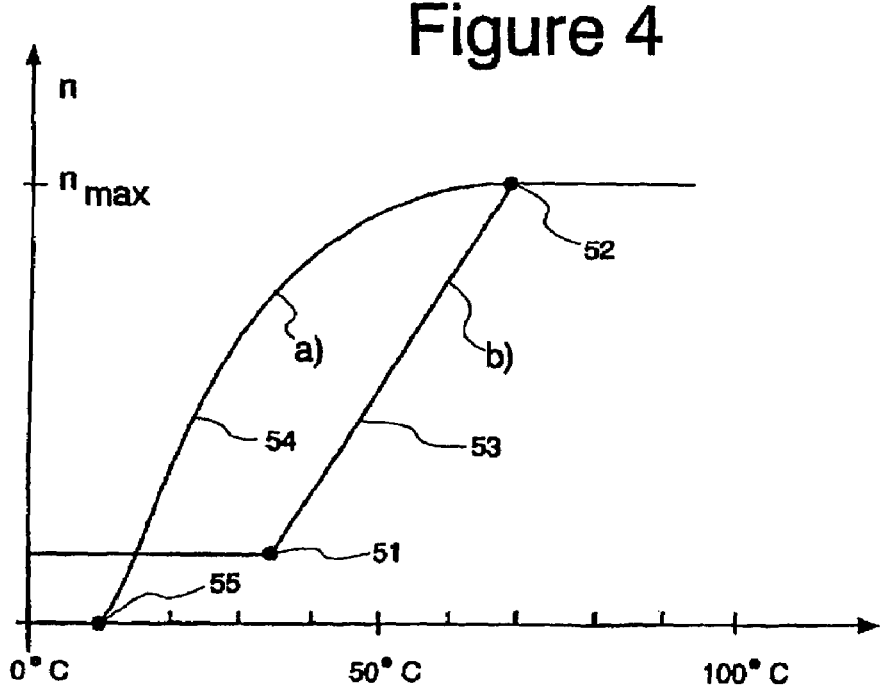

FIG. 5 explains the relation between a determined temperature, e.g., an air temperature, and an allocated, preprogrammed desired rpm. Function 53 consists of several linear segments that have a linearly rising transition 53 between the onset point 51 and end point 52. For temperature values below about 35° C., a lower speed for the motor will be specified, while above about 70° C., a maximum motor speed n(max) should be reached.

A continuous run with lower onset point 55 is represent d by function 54. The motor should then be shut off below a temperature of 10° C. At a temperature of about 25° C., the motor should already be running at 50% of the maximum motor rpm.

Figure 6:
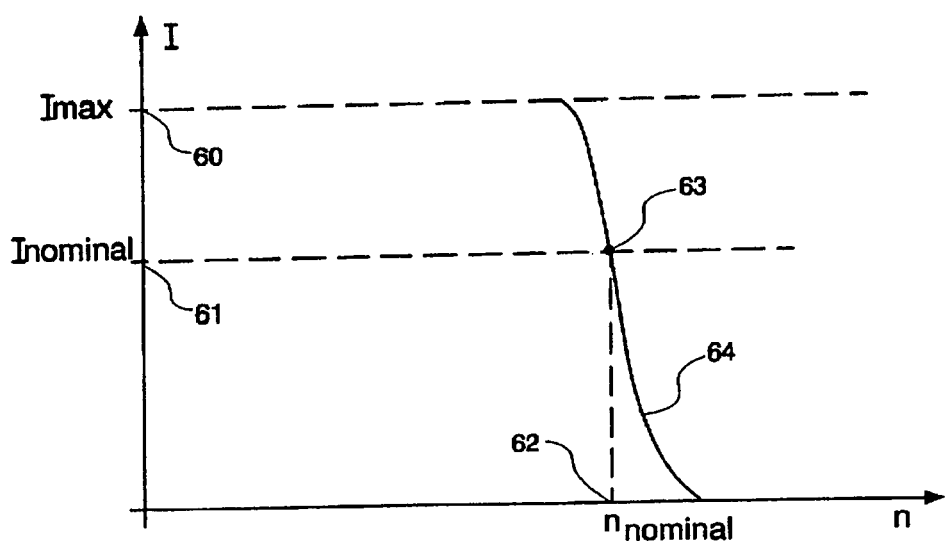

FIG. 6 shows how a speed n(nominal) of the motor can be fixed to the desired, e.g., temperature-dependent, value 62, by means of a control process. If the operating point 63 is abandoned at lowered rpm, then the motor current I will be increased by increasing the pulse duty factor for the individual pulses. A maximum current I(max) (reference no. 50) will not be exceeded however, since the actually flowing motor current will be converted into a measured voltage by means of measurement resistors 18 and 19, which will be converted into a digital value by the A/D converter ADC2 of microprocessor 1104.

In case of excessive current, the drive circuit will then reduce the total motor current. To do this, it will use the microprocessor 1104 that produces single stator current pulses with reduced pulse duty factor (see FIGS. 11a and 11b).

The named speed control with the goal of providing a reliable temperature-independent speed value of the motor, for example, takes place according to standard methodology, inasmuch as the so-called PID control will be designed with digital features in the control circuit. An attendant control level in the drive circuit will then adjust the motor current, depending on the deviation of the actual speed of the motor from a desired speed, and this will continue until the required, desired speed is reached.

This takes place according to the known state of the art inasmuch as the power will be supplied proportional to the deviation (P component for the control, characterized by the factor k(p)), but also as a function of the size of the preceding or following number of motor revolutions (I component of the control), or also depending on how fast the desired and actual speeds are moving apart (D component of the control).

Normally, the procedure is such that the speed will be determined at equidistant time points. By using control factors held constant that are allocated to the referenced P, I and D components of the speed deviation, a motor power feed will then be implemented that will effect the desired speed of the motor within, usually, a short time.

But in the case of the invention it is more advantageous not to determine the speed as equidistant time points, but rather to carry out the speed determination within the cycle of the output of the commutation signal.

But this means that an application of constant control factors will not lead to a satisfactory speed control. Since the drive circuit is equipped with a microprocessor anyway, according to the invention, it is advantageous to adjust the control coefficients to the different length sensing interval (determinative interval) for the rpm. This applies, in particular, for the control coefficient k(p) for the proportional component.

Figure 7:
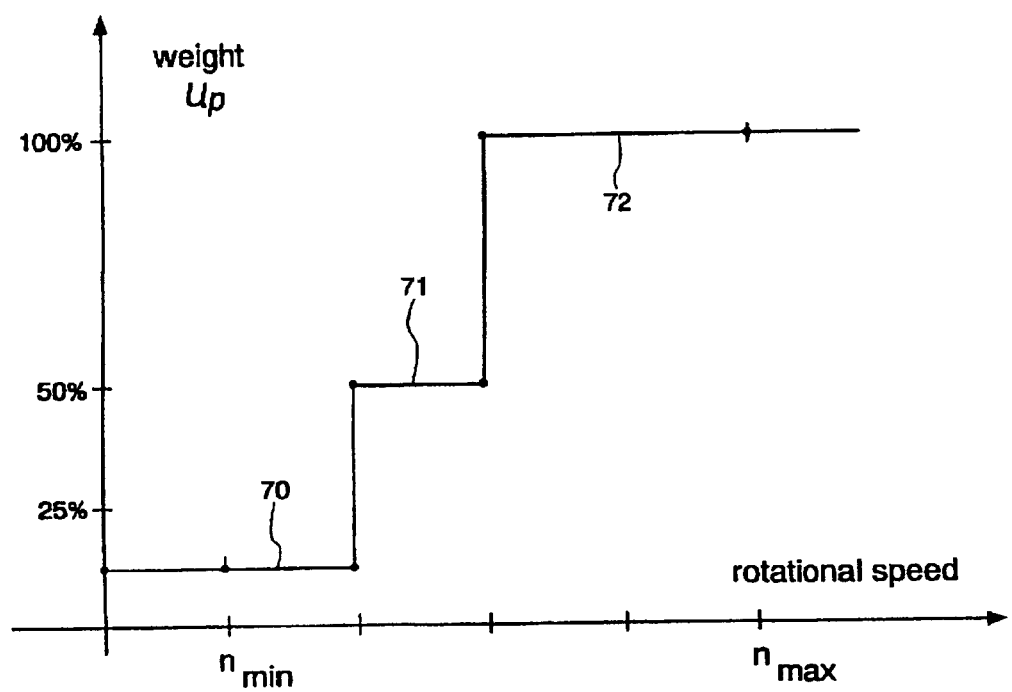

FIG. 7 shows how this kind of adjustment can be effected by simple means, as a function of the motor speed.

In the range of about 60% to 100% of the maximum speed n(max) the characteristic curve range 72 exhibits a nominal weight of 100% for the control coefficient k(p).

If the motor has only a speed of about 40% to 60% of the maximum speed, then due to the then lengthened sensing time interval, a weight of 50% will be used for the control coefficient k(p) (characteristic curve range 71). Beneath this speed range, a characteristic curve range 70 will be used that has a weight of only 12.5% for k(p). With the stated weights of 100%, 50% and 12.5%, the necessary time for the calculation step for the speed control will be favorably reduced since these weights will allow a simple division.

Figure 8:
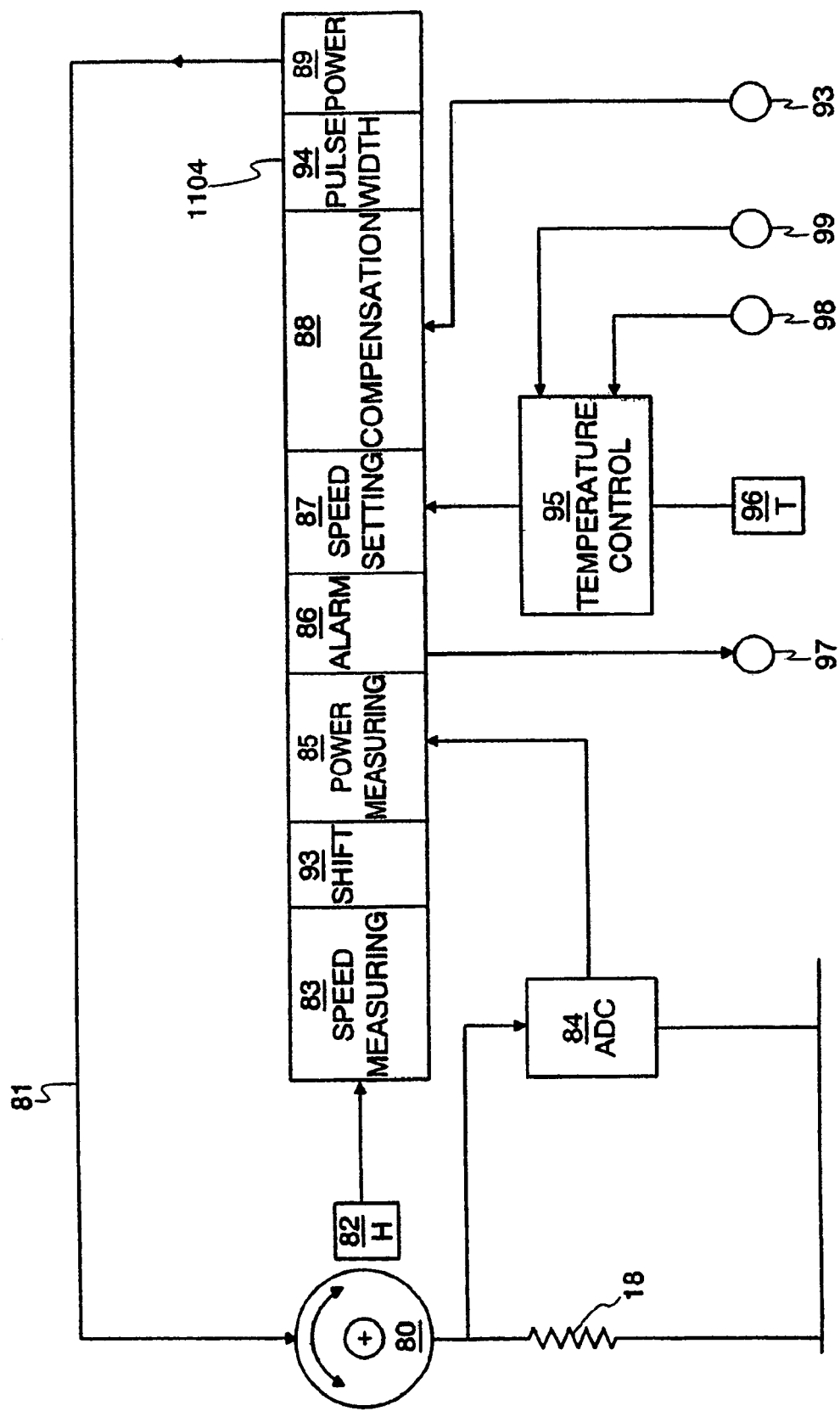

FIG. 8 shows a block diagram for motor 80 and controller 1104.

The motor 80 will be powered via the supply line 81 with high frequency, single pulses of the correct polarity and the resulting motor current will be converted into a digital signal with precision resistor 18 and analog digital converter (ADC) 84, which is fed to the power measuring stage 85.

At the same time, by means of position sensor 82, a position signal will be produced for the rotor, which has a phase offset (precession) in comparison to the run of stator voltages induced by the rotor. This signal will be fed to a time and speed measuring stage 83 whose output signals are switched to the shifting stage 93. Their output signals will be sent to the controller 1104. Likewise, via temperature sensor 96, a temperature will be measured and sent to a temperature control stage 95. At the same time, additional control signals that are applied to junction points 98 and 99 will be sent to this stage.

The output signal of the temperature control stage will be fed to a speed setting unit 87. Another component of controller 1104 is an alarm signal generator 86 that outputs an alarm signal to junction point 97 in case of incorrect motor rpm or if an over-temperature is registered; this alarm signal may also have an overlapped ac voltage component.

Furthermore, the controller 1104 has an input 93 for a cooperation signal that is sent to a compensation unit 88.

A power stage 89 will be driven by the pulse width adjuster 94 and is located either outside of the controller or inside it as an integral unit. It is used for direct power feeding to motor 80.

Figure 9:
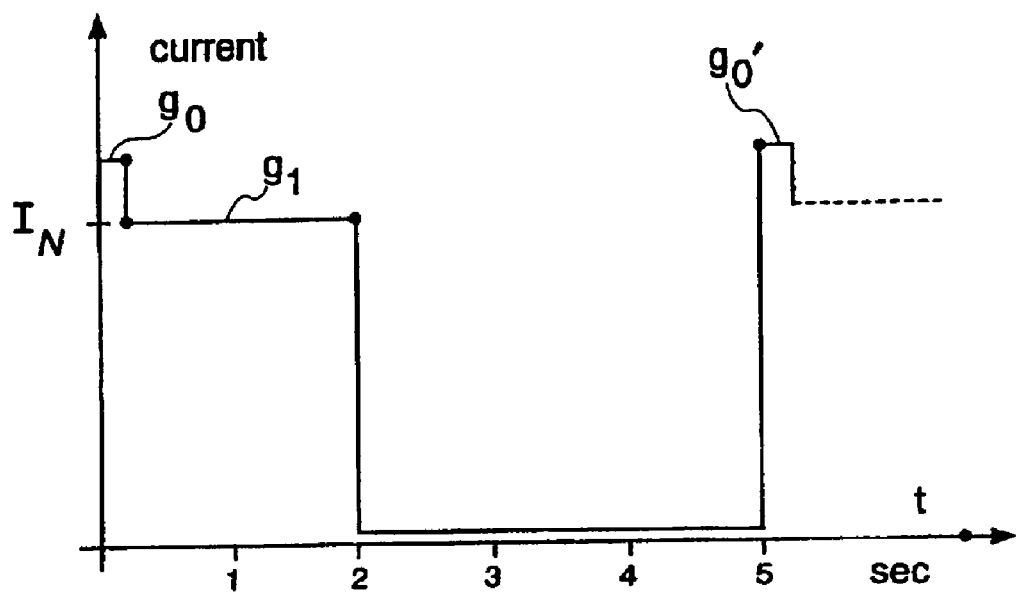

FIG. 9 is a timing chart for a motor current specification with the motor blocked.

For the partial interval 90 with a length of several thousandths of a second, a current in the amount of about 120% of rated current is used. In the following partial interval 91, the rated current will be supplied for about 2 seconds. Next comes a currentless partial interval of several seconds duration. This interplay is repeated with the subsequent partial interval 90' which corresponds to the partial interval 90, until the motor starts turning again. This will be ascertained by a speed check toward the end of partial interval 91.

Figure 10:
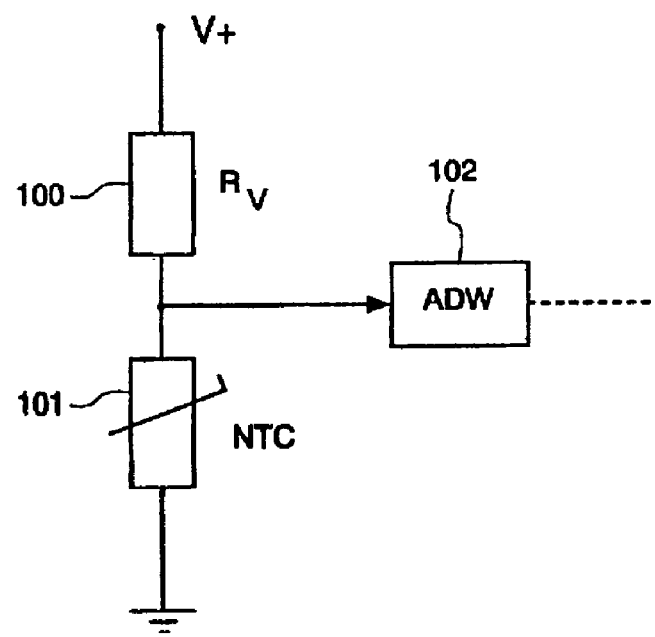

FIG. 10 explains how the self-secured temperature measurement is implemented by means of NTC resistor 101. It is powered via the series resistor 100 by a constant supply voltage. At the junction site of the two resistors, a temperature-related voltage is picked off that is present at the level of the supply voltage in case of fracture of the NTC resistor 101, or in case of short circuiting of the NTC resistor 101, its value will be registered as zero. The temperature-related voltage will be sent to an analog digital converter 102 that is an integral constituent of the temperature control stage 95.

A voltage outside of a predefined region leads to an alarm signal, or, optionally, to motor shut down, or—provided the motor is driving, e.g., a fan—to maximum motor speed.

The output alarm signal may be provided optionally with additional information that will allow a safe or simple validation of the alarm signal by an overhead control device.

One suitable method of the stated kind consists, e.g., in that a valid alarm signal will have a suitable signal level that must rest above a minimal value and below a maximum value.

Another method consists in applying at least one supplemental ac voltage fraction to the alarm signal. This supplement will be predefined with regard to frequency and amplitude, and in case of several ac voltage components, it will also be characterized by the mutual phase relation.

Figure 11A:
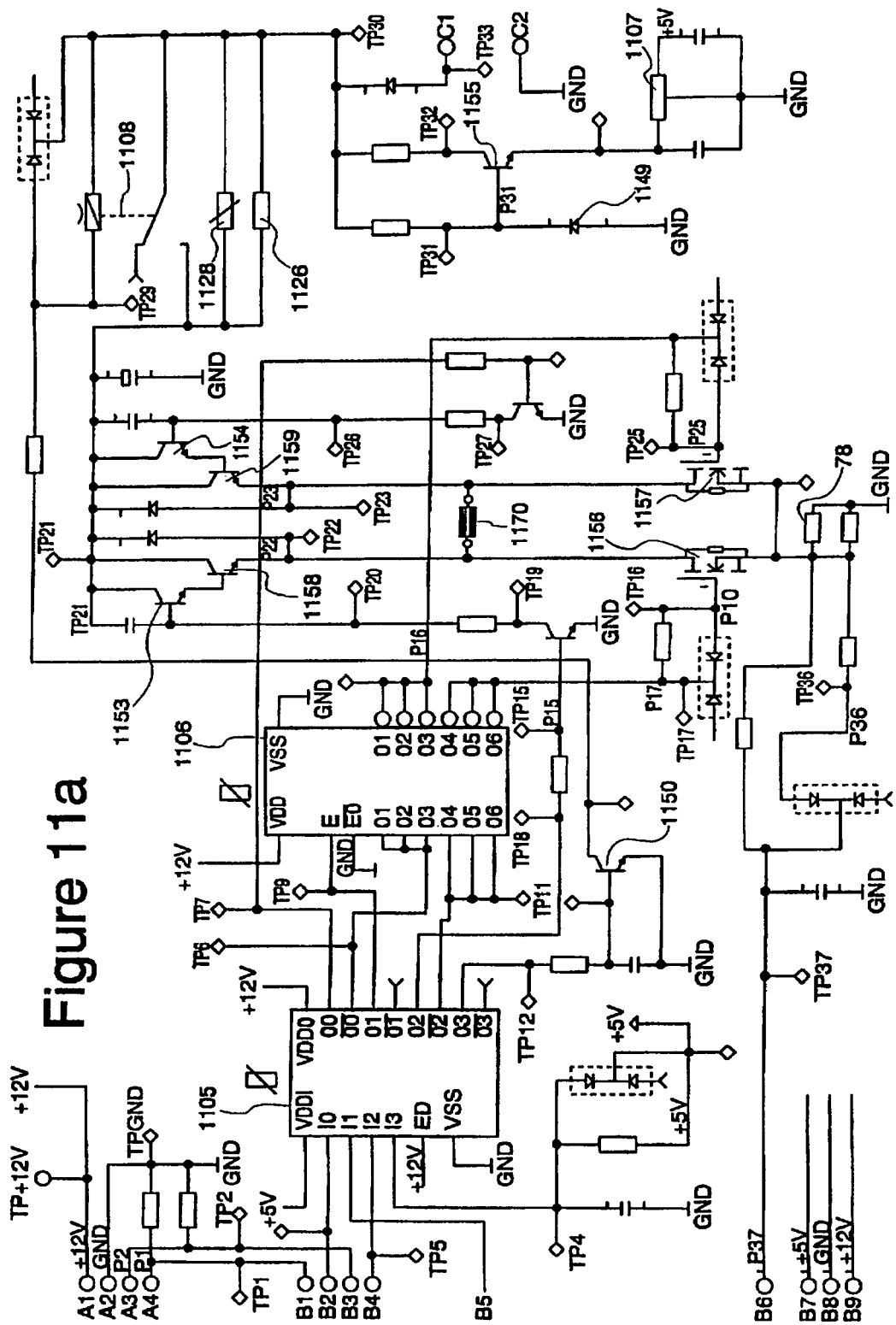
Figure 11B:
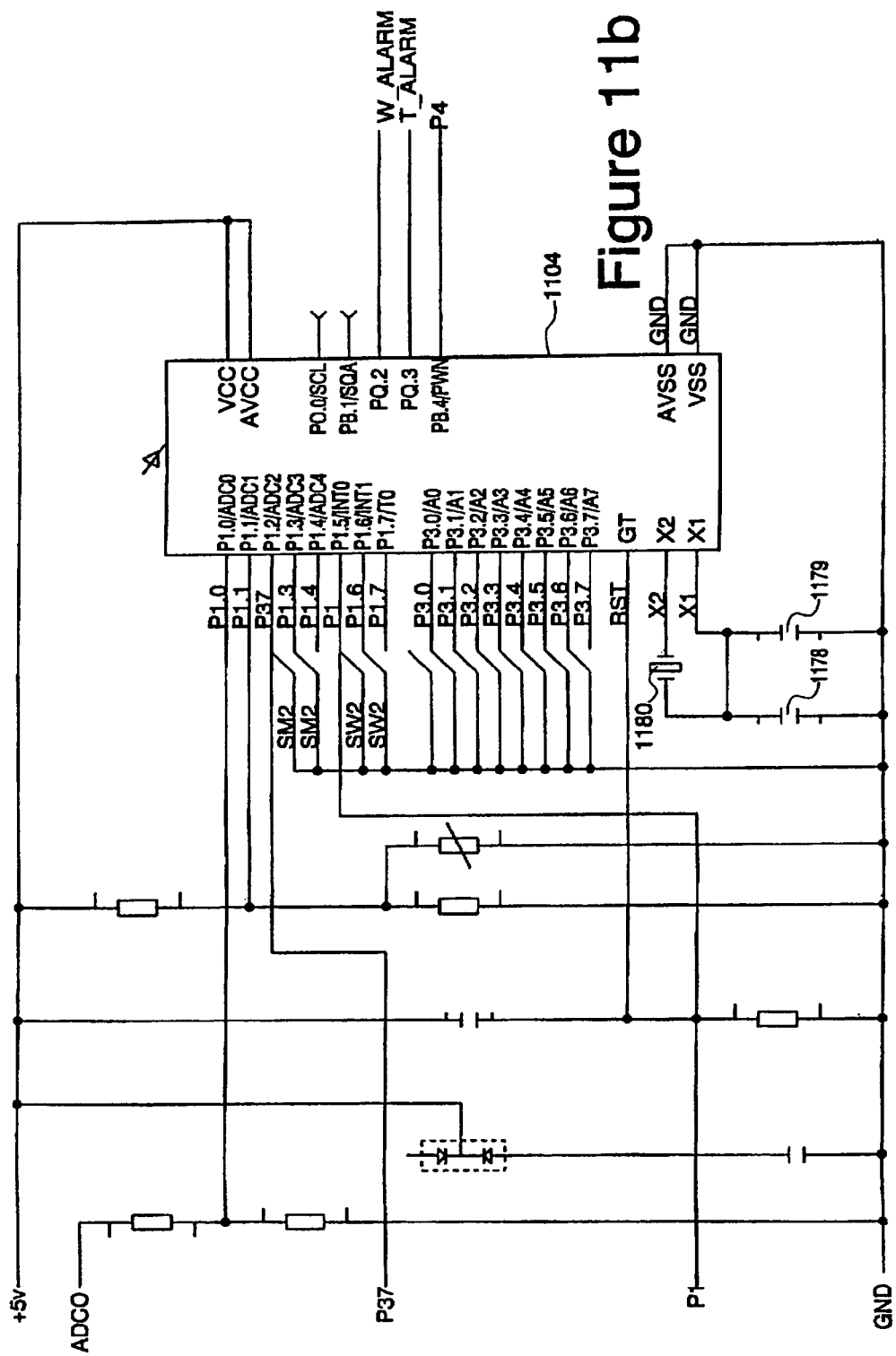
Figure 11C:
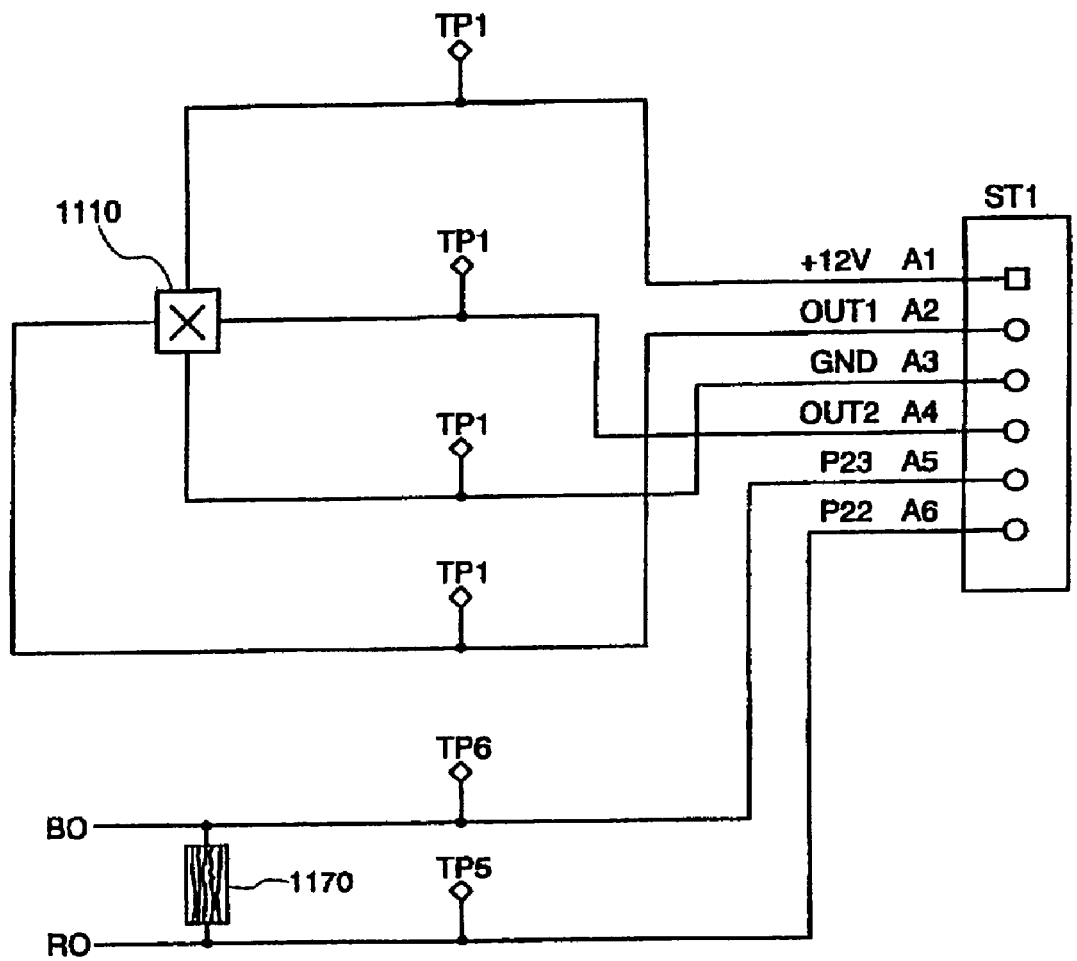
Figure 12:
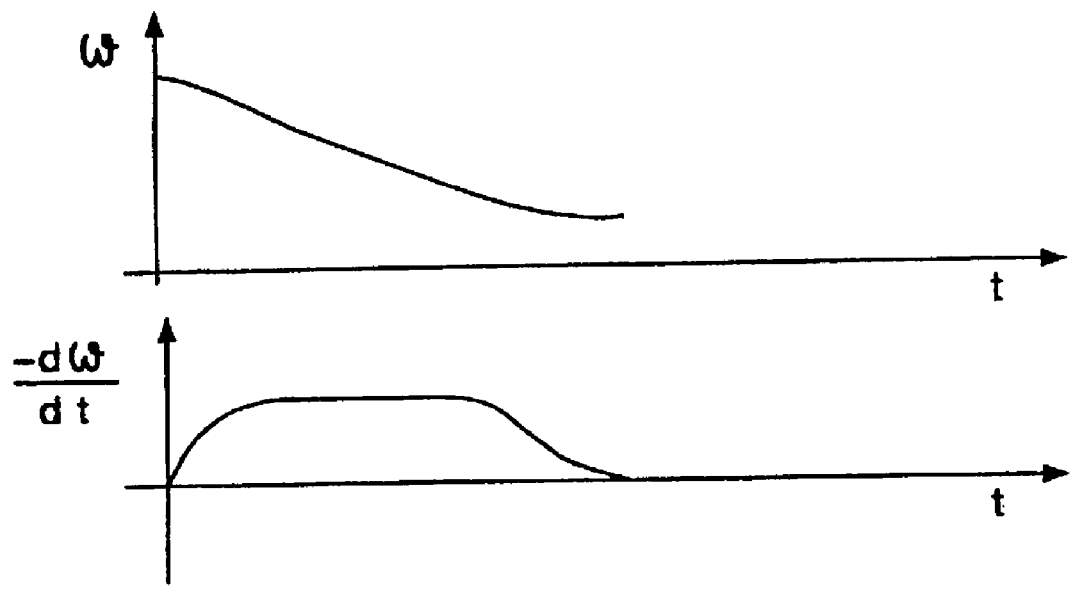

FIGS. 11a, 11b and 11c—which are to be taken together and which are provided with associated connecting line symbols—represent an actual design of the invention for a commutatorless dc motor with auxiliary torque generated by permanent magnet.

A start-up circuit consisting of relay 1108, drive transistor 1150, and resistors 1126 and 1128 prevents power-on current surges and causes a smooth start-up of the motor. After passage of a safety period, shortly after turn-on of the drive circuit, the motor can be powered at maximum permissible current.

A microprocessor 1104, model B7C752, will be clocked by a crystal oscillator 1178, 1179 and 1180 and has a number of digital input and output lines, and also a number of input lines for analog signals.

The output stages 1156, 1157, 1158 and 1159 are driven with pulse generator stages 1105 and 1106 via allocated driver stages 1153 and 1154, or they are driven directly.

In the illustrated example, in a known manner, by means of a full bridge circuit of transistors 1153, 1154, 1156 and 1157, an alternating current is set through the individual motor coils 1170.

As explained above, the power or commutation takes place according to a sensor 1110 that determines the rotor position and its output signal is used to determine the rotor speed, where its output signal will be modified as a function of the rotor speed in another part of the drive circuit for the purpose of motor commutation.

To implement a large number of the above stated functions, it is possible per this invention to use the single controller 1104 as control and regulation unit; as we see, it can make do with a minimum of external circuit features but will have to be provided with suitable, internally stored software.

Finally, FIG. 11A show a 5 V power supply for the existing logic circuits.

This power supply is fed by the motor power supply via a prevoltage regulator that consists essentially of Zener diode 1149 and regulating transistor 1155. At its node with the collector a dc voltage of about 12 V is available to power a downstream voltage regulator 1107, model 7805. A stabilized dc voltage of 5 V is available at its output.

The invention claimed is:

1. An assembly comprising:
   a load member; and
   a brushless DC motor, comprising:
   a rotor;
   a stator housing at least one stator coil; and
   a drive circuit comprising:
   a rotor position measurement circuit for measuring angular position of the rotor relative to the stator and for determining motor speed:
   a commutator circuit for connecting and interrupting current to the stator coil at specified moments of commutation determined from the angular rotor position relative to the stator; and
   a commutation shifting apparatus for shifting the specified moments of commutation, the amount of shifting being a predetermined function of motor speed and wherein the commutation shifting apparatus pre-displaces the moments of commutation increasingly toward the rotational position of the rotor after a specified motor speed has been exceeded.

2. The assembly of claim 1, wherein the commutation shifting apparatus shifts the moment for turn-on of a motor current that is allocated to one commutation phase.

3. The assembly of claim 1, wherein the commutation shifting apparatus shifts the moment for turn-off of a motor current that is allocated to one commutation phase.

4. The assembly of claim 1, wherein the drive circuit further comprises a microprocessor controller.

5. The assembly of claim 1, wherein the drive circuit further comprises a speed control circuit.

6. The assembly of claim 1, wherein the rotor position measuring circuit comprises a circuit for measuring motor speed and wherein the amount of commutation moment shifting by the commutation shifting apparatus is a predetermined function of measured motor speed.

7. The assembly of claim 6, wherein the commutation shifting apparatus pre-displaces the moments of commutation relative to the rotational position of the rotor, as a function of the estimated motor speed.

8. The assembly of claim 1, wherein the rotor position measuring circuit comprises a circuit for estimating motor speed and the amount of commutation moment shifting by the commutation shifting apparatus is a predetermined function of estimated motor speed.

9. An assembly, comprising:
   a load member; and
   a brushless DC motor, comprising:
   a rotor;
   a stator housing at least one stator coil; and a drive circuit comprising:
   a rotor position measuring circuit for measuring angular position of the rotor relative to the stator and for determining motor speed;
   a commutator circuit for connecting and interrupting current to the stator coil at specified moments of commutation determined from the angular rotor position relative to the stator; and
   a commutation shifting apparatus for shifting the specified moments of commutation, the amount of shifting being a predetermined function of motor speed, wherein the moments of commutation are shifted as a function of the motor speed according to an unsteady function and wherein the commutation shifting apparatus pre-displaces the moments of commutation increasingly toward the rotational position of the rotor after a specified motor speed has been exceeded.

10. The assembly of claim 9, wherein the commutation shifting apparatus shifts the moment for turn-on of a motor current that is allocated to one commutation phase.

11. The assembly of claim 9, wherein the commutation shifting apparatus shifts the moment for turn-off of a motor current that is allocated to one commutation phase.

12. The assembly of claim 9, wherein the drive circuit further comprises a microprocessor controller.

13. The assembly of claim 9, wherein the drive circuit further comprises a speed control circuit.

14. The assembly of claim 9, wherein the first apparatus comprises a circuit for measuring motor speed and wherein the amount of commutation moment shifting by the commutation shifting apparatus is a predetermined function of measured motor speed.

15. The assembly of claim 14, wherein the commutation shifting apparatus pre-displaces the moments of commutation relative to the rotational position of the rotor, as a function of the estimated motor speed.

16. The assembly of claim 9, wherein the rotor position measuring circuit comprises a circuit for estimating motor speed and the amount of commutation moment shifting by the commutation shifting apparatus is a predetermined function of estimated motor speed.

17. An assembly comprising:
   a load member; and
   a brushless DC motor, comprising:
   a rotor;
   a stator housing at least one stator coil; and
   a drive circuit comprising:
   a rotor position measuring circuit for measuring angular position of the rotor relative to the stator and for determining motor speed;
   a commutator circuit for connecting and interrupting current to the stator coil at specified moments of commutation determined from the angular rotor position relative to the stator; and
   a commutation shifting apparatus for shifting the specified moments of commutation, the amount of shifting being a predetermined function of motor speed, wherein the moments of commutation are shifted as a function of the motor speed according to a piece-wise linear function and wherein the commutation shifting apparatus pre-displaces the moments of commutation increasingly toward the rotational position of the rotor after a specified motor speed has been exceeded.

18. The assembly of claim 17, wherein the commutation shifting apparatus shifts the moment for turn-on of a motor current that is allocated to one commutation phase.

19. The assembly of claim 17, wherein the commutation shifting apparatus shifts the moment for turn-off of a motor current that is allocated to one commutation phase.

20. The assembly of claim 17, wherein the drive circuit further comprises a microprocessor controller.

21. The assembly of claim 17, wherein the drive circuit further comprises a speed control circuit.

22. The assembly of claim 17, wherein the first apparatus comprises a circuit for measuring motor speed and wherein the amount of commutation moment shifting by the commutation shifting apparatus is a predetermined function of measured motor speed.

23. The assembly of claim 22, wherein the commutation shifting apparatus pre-displaces the moments of commutation relative to the rotational position of the rotor, as a function of the estimated motor speed.

24. The assembly of claim 17, wherein the rotor position measuring circuit comprises a circuit for estimating motor speed and the amount of commutation moment shifting by the commutation shifting apparatus is a predetermined function of estimated motor speed.

25. An assembly comprising:
a load member; and
a brushless DC motor, comprising:
a rotor;
a stator housing at least one stator coil; and
a drive circuit comprising:
a rotor position measurement circuit for measuring angular position of the rotor relative to the stator and for determining motor speed:
a commutator circuit for connecting and interrupting current to the stator coil at specified moments of commutation determined from the angular rotor position relative to the stator; and
a commutation shifting apparatus for shifting the specified moments of commutation, the amount of shifting being a predetermined function of motor speed and wherein the commutation shifting apparatus, responsive to initial start-up, pre-displaces the moments of commutation by a specified, first electrical preignition angle with respect to the rotational position of the rotor.

26. An assembly, comprising:
a load member; and
a brushless DC motor, comprising:
a rotor;
a stator housing at least one stator coil; and
a drive circuit comprising:
a rotor position measuring circuit for measuring angular position of the rotor relative to the stator and for determining motor speed;
a commutator circuit for connecting and interrupting current to the stator coil at specified moments of commutation determined from the angular rotor position relative to the stator; and
a commutation shifting apparatus for shifting the specified moments of commutation, the amount of shifting being a predetermined function of motor speed, wherein the moments of commutation are shifted as a function of the motor speed according to an unsteady function and wherein the commutation shifting apparatus, responsive to initial start-up, pre-displaces the moments of commutation by a specified, first electrical preignition angle with respect to the rotational position of the rotor.

27. An assembly comprising:
a load member; and
a brushless DC motor, comprising:
a rotor;
a stator housing at least one stator coil; and
a drive circuit comprising:
a rotor position measuring circuit for measuring angular position of the rotor relative to the stator and for determining motor speed;
a commutator circuit for connecting and interrupting current to the stator coil at specified moments of commutation determined from the angular rotor position relative to the stator; and
a commutation shifting apparatus for shifting the specified moments of commutation, the amount of shifting being a predetermined function of motor speed, wherein the moments of commutation are shifted as a function of the motor speed according to a piece-wise linear function and wherein the commutation shifting apparatus, responsive to initial start-up, pre-displaces the moments of commutation by a specified, first electrical preignition angle with respect to the rotational position of the rotor.

* * * * *